Sept. 8, 1964 J. W. OEHRLI 3,147,644
SHARPENING MEANS FOR CHAIN SAWS
Filed Oct. 4, 1960 3 Sheets-Sheet 1
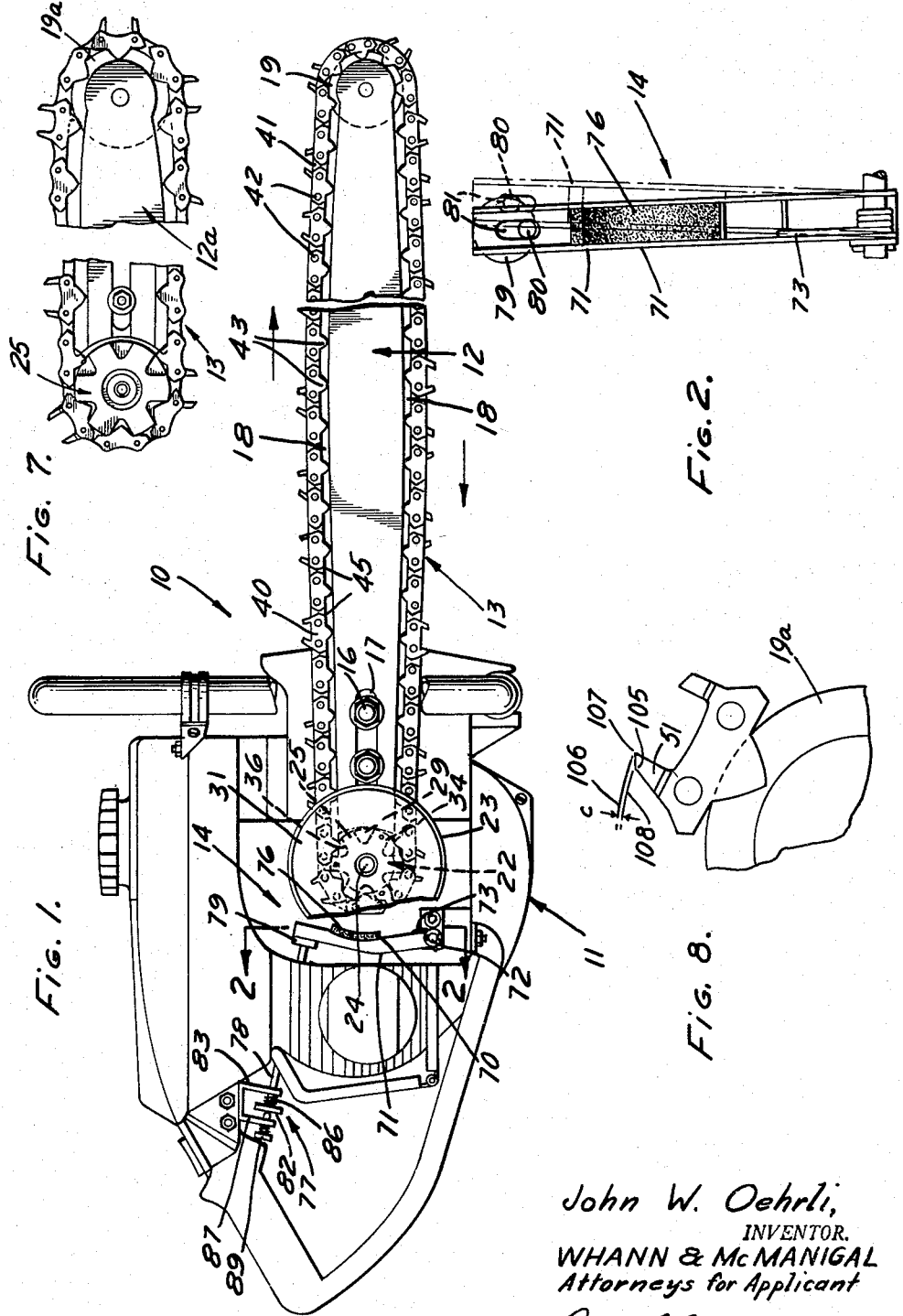
John W. Oehrli,
INVENTOR.
WHANN & McMANIGAL
Attorneys for Applicant Sept. 8, 1964   J. W. OEHRLI   3,147,644
SHARPENING MEANS FOR CHAIN SAWS
Filed Oct. 4, 1960   3 Sheets-Sheet 2
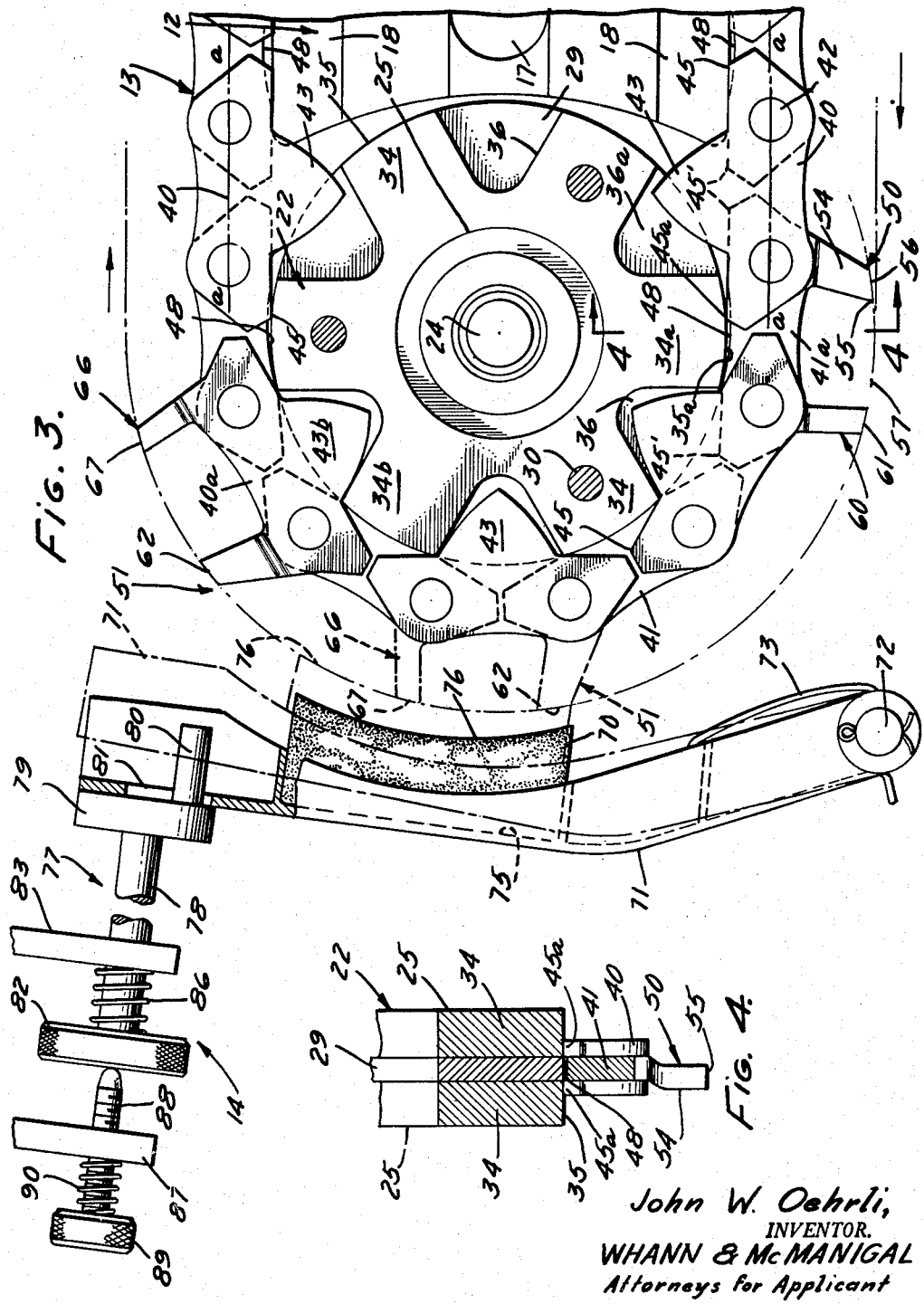
John W. Oehrli,
INVENTOR.
WHANN & McMANIGAL
Attorneys for Applicant Sept. 8, 1964       J. W. OEHRLI       3,147,644
SHARPENING MEANS FOR CHAIN SAWS
Filed Oct. 4, 1960                         3 Sheets-Sheet 3

John W. Oehrli,
INVENTOR.
WHANN & McMANIGAL
Attorneys for Applicants

United States Patent Office 3,147,644
Patented Sept. 8, 1964

3,147,644
SHARPENING MEANS FOR CHAIN SAWS
John W. Oehrli, Pacific Palisades, Calif., assignor to Mc-
Culloch Corporation, Los Angeles, Calif., a corporation
of Wisconsin
Filed Oct. 4, 1960, Ser. No. 60,451
8 Claims. (Cl. 76—37)

This invention relates to means for sharpening saw chains and more particularly, to sharpening means attachable to a chain saw for sharpening the cutting elements of the saw chain during cutting operations.

It is an object of the invention to provide means to sharpen saw chains accurately and efficiently and, in general, to obtain better sharpening results than was heretofore possible.

It is another object of the invention to provide sharpening means for saw chains that will maintain the cutting elements in their optimum sharpened condition.

It is still another object of the invention to provide means to sharpen the cutting elements and to correspondingly accurately reduce the length of the depth gauges during cutting operations.

It is a further object of the invention to provide sharpening means for saw chains to sharpen the cutting edges much more accurately than can be done by using a file. That is, the present invention permits an unskilled user to obtain better sharpening results than can be obtained by an expert tool maker using a file or a grinding wheel.

It is a still further object of the present invention to provide a sharpening means which will sharpen cutting elements and reduce the length of depth gauges that are much harder than file hardness. By making the cutting elements and depth gauges harder than those that could be sharpened with a file, the life of the saw chain is greatly prolonged.

It is another object of the invention to provide a sharpening means for saw chains to be used in cooperation with a drive mechanism and chain which function to hold the chain in a constant radial position so that the cutting elements all pass through the same position on an arc and be sharpened the proper amount.

It is a further object of the invention to provide on a chain saw engine frame a pivotable hone which may be moved from a non-sharpening position to a sharpening position where its sharpening surface is coincident with an arc on which the cutting edges and outer surfaces of the depth gauges travel.

It is a still further object of the invention to provide on a chain saw engine frame a grinding wheel which may be moved from a non-sharpening position to a sharpening position where its sharpening surface is on a point of an arc on which the cutting edges and outer surfaces of the depth gauges travel.

It is a still further object of the invention to provide on a chain saw engine frame a pivotable hone which may be oscillated transversely with respect to the saw chain to prevent formation of grooves in the hone during the sharpening operation.

It is another object of the invention to provide a sharpening means on a chain saw frame for sharpening teeth of different lengths during cutting operations.

Further objects and advantages of the invention will be brought out in the following part of the specification wherein small details have been described for the competance of disclosure, without intending to limit the scope of the invention which is set forth in the appended claims.

Referring to the accompanying drawings which are for illustrative purposes only:

FIG. 1 is a side elevational view of a chain saw embodying the present invention;

FIG. 2 is a front view of a saw chain sharpening hone mounted on a chain saw frame and taken as indicated along the line 2—2 of FIG. 1;

FIG. 3 is an enlarged fragmentary view of a sharpening hone illustrating the sharpening and non-sharpening positions of the hone relative to the cutting elements of the saw chain;

FIG. 4 is an enlarged fragmentary view taken along the line 4—4 of FIG. 3;

FIG. 7 is a side view of a saw bar or blade wherein the nose is a greater radius than the chain driving sprocket; and FIG. 8 is an enlarged fragmentary view showing a link of the saw chain on the nose of the bar.

Figure 5:
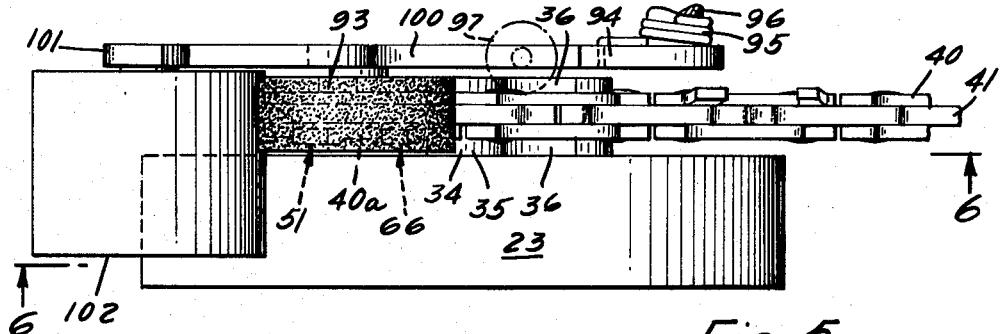
FIG. 5 is a fragmentary plan view illustrating another form of the invention.

Referring again to the drawing, there is illustrated in FIG. 1 a chain saw generally designated as 10 having an engine and frame portion 11, a bar or blade 12, a saw chain 13 which is driven by the engine and which travels on the bar, and a sharpening mechanism designated generally as 14 secured on the engine frame.

The bar 12 is adjustably secured to the engine 11 by bolts 16 extending through slot 17. The bar 12 is of the plain type having tongue members 18 extending outwardly of the central portion, forming longitudinal peripheral members which are straddled by the chain. On the outer or nose end of the bar is a rotatable wheel 19, bearing mounted in alignment with tongues 18 and on which the chain rides.

The chain is driven by a sprocket assembly, generally designated as 22, which is secured to a clutch drum 23. The sprocket assembly 22 is bearing mounted on the engine shaft 24 and is driven when the unshown clutch mechanism, having parts thereof secured to the shaft, is rotated so that pivot arms in the clutch are moved by centrifugal force to engage the clutch drum 23 causing it and the sprocket assembly to rotate.

As best seen in FIGS. 3 and 4, the sprocket assembly 22 is comprised of two sprocket wheels 25 having a disc 29 spaced between them and being in integral abutment therewith. The sprocket wheels 25, only one of which is shown, have the same diameter as the disc with which they are axially aligned and the three parts are secured together by pins 30. As indicated in FIG. 1, the sprocket assembly 22 is similarly integrally secured to the inner wall 31 of the clutch drum. Each wheel 25 is shown to have six relatively wide teeth 34 having outer circumferential surfaces 35 coincident with the circumferential surface of the disc 29 and spaced between the teeth 34 are sprockets 36. The pockets between the teeth at the circumference of the disc have the length of an arc substantially equal to the arc formed by the outer surfaces 35 of the teeth.

As shown in FIGS. 1, 3 and 4, the saw chain includes side links 40 and center links 41 connected consecutively by pintles 42. Extending inwardly of the chain on the side links 40 are sprocket engaging projections 43 on both sides of the chain so as to straddle saw bar tongues 18 and the bar nose wheel 19. The projections 43 are the means by which the sprocket assembly 22 drives the chain, the former being engaged with the wheels 25 in the pockets 36 and straddling the disc 29.

On the inner surfaces of the side links 40, in horizontal alignment with the inner edges of the center links 41, are extensions 45 disposed longitudinally outwardly of the pintles and of the projections 43. Each extension 45 is limited longitudinally to provide clearance with the extension on the next link and, as shown in FIG. 3, contacts the outer circumferential surface 35a of the first sprocket tooth 34a, at any instantaneous time, as the chain moves from the lower tongue 18 to engage the sprocket. The extension 45a is shown to be engaging the surface 35a as the following projection 43 on the same link enters the pocket 36a. It should be noted that the contact of extension of 45a with surface 35a occurs before the former reaches the vertical diameter through the sprocket assembly and which is substantially perpendicular to the path of the chain at the point where the line of direction of the chain would form a tangent on surface 35a. The contact of extension 45a on the surface 35a limits the vertical movement of the side and center links on the sprocket so as to provide a smooth and constant positioning of the chain on the sprocket and to properly position the cutting elements for sharpening. By having the chain enter engagement with the sprocket in this manner, teetering on meshing is prevented and the wear which occurs as the result of teetering in a conventional chain between the abrasive parts is also eliminated.

To further aid in properly positioning the chain radially on the sprocket assembly, each center link 41 has extensions 45′ equivalent to extensions 45 on the side links and for the same purpose. They, of course, make contact with disc 29 rather than with the sprocket teeth. In addition, each center link has a longitudinally arced, transverse inwardly facing surface 48, best seen in FIGS. 3 and 4. The arced surfaces 48 have the same radii as the disc 29 and the wheels 25 and when the center links 41 move past the first engaged tooth 34a and on to the sprocket, the center of the arcs 48 and the center of the sprocket assembly 22 become coincident, the surfaces 48 riding on the circumferential surface of the disc 29 so as to maintain the chain links concentric after the initial meshing with the sprocket assembly in a constant radial position with non-teetering movement. Since the chain on the sprocket assembly remains in a constant radial position after the first tooth 34a is engaged, there is no vibration and little wear in the chain and sprocket so as to thereby provide a very smooth running chain.

In the sprocket and chain arrangement, as shown in FIG. 3, the projections are not in driving contact with the sprocket teeth 34 until just prior to the position where the chain leaves the sprocket assembly, as where a sprocket tooth 34b is in contact with projection 43b. By having the drive occur as the chain leaves the sprocket, no interference is encountered as the chain enters into engagement with the sprocket, as may be seen in FIG. 3, where the first two engaged projections 43 are spaced from the respective teeth 34 of the sprocket. Thus, the engaging action is particularly smooth. This type of drive develops in a gradual approach; that is, as the sprocket tooth 34a rotates it gradually changes its relative, non-contacting position with the projection ahead of it until it finally takes the position of tooth 34b in contact with projection 43b. Another advantage of this arrangement is that it eliminates wear which occurs in conventional chains where there is a rapid drive approach whereby there is a pounding of the side links as they first engage the sprocket tip.

As shown in FIG. 1, center and side cutting elements extend vertically outwardly from selected center and side links respectively. As best shown in FIG. 3, a center cutting element 50 is extended vertically outwardly from selected center link 41a and a side cutting element 51 is extending vertically outwardly from selected side link 40a. In cutting sequence, a pair of allochiral left and right-hand trough cutting center cutters are normally followed by a pair of shorter allochiral left and right-hand side cutters on opposite sides of the chain to complete a cutting group of four cutting elements.

Each center cutter has a flat sided shank 54 extending outwardly from a selected center link and outwardly of the horizontal or transverse central plane a—a of the chain. The respective left and right-hand shanks are offset transversely outwardly and at their upper ends are transverse cutting edges 55, formed on a forward facing beveled surface.

The outer surfaces 56 of the center cutting elements are curved and lie on arcs 57 of equal radii, the centers of which are on an unshown line, perpendicular to the center plane a—a and midway between the axes of each pair of pintles 42 so that the vertical distance of the outer surfaces 56 and the cutting edges from the plane a—a is determined by the longitudinal distance from the aforesaid unshown line and the axes of the pintles. In other words, the cutting edges 55 on each of the center cutters are of the same distance from the plane a—a and, therefore, are the same horizontal distance from the axes of the respective pintles of the center links 41a.

Forwardly of each center cutter on its selected center link and spaced therefrom is a depth gauge 60 of lesser height than the cutting edge 55. The outer curved surfaces 61 of each depth gauge are on the same arc 57 as the outer surfaces of the cutting elements, the depth gauges being shorter than the cutters because they are farther longitudinally outwardly from the center point between the respective pintles 42.

The side cutting elements, as they follow the center cutting elements, extend sufficiently inwardly toward the vertical plane of the chain to overlap the cut made by the preceding center cutters. That is, the side cutters widen the trough cut by the center cutters to complete the kerf. The side cutters also have curved outer surfaces 62 which lie on an arc 57, as shown in dotted lines, around the drive mechanism where its center is on the center of the drive shaft 24. In other words, the side cutters are on arcs equivalent to those of the center cutters but the side cutters are shorter than the center cutters because they are spaced a longer horizontal distance away from the center point between the pintles on the respective side links.

Spaced forwardly of the side cutters on the respective side links are depth gauges 66 which, like the depth gauges forwardly of the center cutters, have their top or outer surfaces 67 on the equivalent arcs 57. As the depth gauges 66 are spaced the greatest distance from the center line between the corresponding pintles 42, relative to the cutting elements and the other depth gauges, they extend the shortest distance vertically outwardly from the plane a—a.

The particular arrangement of the cutting elements and depth gauges, all being on arcs having equal radii, and when rotated on to the driving mechanism, according to the present invention, on which they are maintained in a constant radial position and which has the same center as the arcs, makes it possible to sharpen the chain with a hone 70 in the sharpening mechanism 14, as shown in FIGS. 1, 2 and 3, so that each outer surface of each cutter and depth gauge contacts the sharpening surface of the hone at the same distance from the center of the arc. This, of course, provides a much better way of sharpening than the use of an individual file, both as to speed and as to accuracy. In addition, it permits the cutting teeth and depth gauges to be made harder than they can be made when the sharpening is accomplished by a file.

The sharpener 14 is comprised of an elongated hone holder and positioner 71 which is pivotally mounted at its lower end to the engine frame 11 on pin 72, aligned so that as the holder is pivoted on the pin, it moves in vertical planes so as to be in longitudinal alignment with the path of the saw chain. The holder 71 is biased to hold the hone away from the chain in its normal non-sharpening position by means of spring 73. The hone holder 71 is fitted loosely on pin 72 so that it can be oscillated laterally with respect to the chain, when it is moved into its sharpening position, to prevent the wearing of undesirable grooves in its sharpening surface 76, said surface being complementary to and having the same radius as arc 57 whereby when the holder 71 is pivoted toward the saw chain so that surface 76 lies on arc 57, the center of the sharpening surface is coincident with the center of drive shaft 24. The hone 70 is secured in the holder in a pocket 75.

At the upper end of the holder 71 is the sharpener actuating means generally designated as 77. It is comprised of a main rod member 78, having at its one end a disc 79 concentrically mounted thereon and from the disc extends an off center pin 80. Pin 80 extends into the holder through a vertical slot 81. At the other end of rod 78 is a rotatable knob 82 having a knurled circumferential surface, and inwardly of knob 82, the rod is supported by a frame member 83 extending from the engine body. Between knob 82 and frame member 83 extends coil spring 86 on rod 78 so as to bias the knob away from the chain in the same direction as spring 73 biases the entire sharpener assembly. Outwardly of knob 82 is a second frame member 87, parallel to member 83, and having threadedly engaged therein an actuating screw 88 which on its outer end has a knurled knob 89. Between the knob 89 and the frame 87 on screw 88 is a coil spring 90 which exerts a pressure on the knob to prevent undesired rotation of the screw 88.

In operation, to sharpen the cutting edges of the center and side cutting elements and to correspondingly reduce the length of the depth gauges on the center and side links, the knob 89 is rotated to advance the screw 88 toward and into contact with knob 82 so as to move it against the force of spring 86 and to cause the rod 82 to slide in frame 83 to thereby pivot the hone holder 71 to its position, shown in broken lines in FIG. 3, where the arc of the surface 76 is coincident with the arc 57. In this position the normal movement of the chain, being held in a constant radial position on the drive mechanism, will cause the cutting elements and depth gauges to be properly sharpened. Thus, for example, the side cutter 51, shown in dotted lines in its position for sharpening in FIG. 3, as it moves past the hone 70, is abraded by its surface 76. Having been sharpened, the outer surfaces 62 and 67 of the side cutter 51 and depth gauge 66, respectively, have had material removed from them so as to shorten the length of the cutting element and the length of the depth gauge a definite amount, imperceptible in the drawing. In other words, in FIG. 3, cutter 51 is shorter in its position in the upper part of the drawing than it was when it was in the lower part thereof prior to moving into sharpening contact with the hone 70.

As shown in FIG. 2, to prevent the creating of undesirable grooves in the surface 76 of the hone during the sharpening operation, knob 82 is rotated to oscillate the holder 71, loosely fitted on pin 72, by means of the off center pin 80 in the slot 81. That is, while sharpening, the operator rotates knob 82 slowly and thereby maintains a properly arced surface of sufficient width so that as the hone wears, a newly formed surface is formed which will be wide enough to receive the side cutters on opposite sides of the chain without an improper contact with the hone. Thus, any groove formed in the surface 76 will be wider than the widest part of the chain.

After the chain has made one or more passes over the hone, as found to be desired during a continuous cutting operation, the knob 89 is rotated to be moved away from the knob 82 and the spring 73 moves the holder away from the arc 57 and moves the knob 82, as assisted by the spring 86, away from the driving mechanism. During the sharpening operation the respective arcs 57 will be correspondingly decreased slightly in radius and will, thereby, remain in proper alignment with each other.

Thus, during any cutting operation when the operator detects that the saw chain is dulling, as he is able to do from experience, he can, while continuing the cutting operation, move the hone into precise contact with the surfaces of the cutting edges and the depth gauges by means of the screw 88, and as soon as he detects that the saw has been sharpened, he can allow the hone to be withdrawn from contact with the chain. When the cutting elements and depth gauges are sharpened, even though they become shorter, they all remain on the same arcs of the same radii and when the arcs pass over the driving mechanism 22, they have the same center which also remains the center of the arc on the hone in its sharpening position. However, the hone need not be in arc form but need only be such that when pivoted toward the chain, it contacts the arc 57 at one point at which each cutting edge and depth gauge will make tangential contact to be sharpened.

Another advantage of the invention is that by sharpening the chain as it passes around the sprocket mechanism, where the radius of the latter is smaller than that of nose wheel or nose of the bar a clearance angle on the top of the teeth for boring operations is provided. That is, if the radius of the sharpening arc and the radius of the boring arc were the same, there would be no clearance between the tops of the teeth and the surface of bore being cut but by having the radius of the teeth smaller, the heels of the cutters are clear of and do not make contact with the bore.

With particular reference to FIG. 7 there is shown a nose wheel 19a at the nose or free end of the bar 12a, although it is to be understood that some bars do not have a nose wheel but are merely convexly arcuate in shape at the nose or forward free end. In either event the radius of the nose wheel 19a or the convexly arcuate nose or free end of the bar is greater than the radius of the sprocket 25 where the sharpening of the cutting teeth of the chain occurs as the chain passes around said sprocket. In other words, the cutting teeth are sharpened as they move in an arcuate path about that portion of the sprocket over which the chain is passing.

With this arrangement there is a predetermined clearance, as shown at C in FIG. 8, between the heel 105 of the cutting tooth 51 and the surface of the bore being cut. It is to be understood, of course, that, since the cutting tooth 51 shown in FIG. 8 is typical of all of the cutting teeth of the chain, only one tooth is shown and described for purposes of bringing out the relationship of various parts of the teeth and the bottom of the kerf.

It is also to be understood that in FIG. 8 the angle of the outer end of the cutting tooth 51 and the clearance of the heel with respect to the path of the cutting edge thereof and bottom of the kerf is exaggerated in order to more clearly illustrate the present feature of the invention.

Referring further to FIG. 8, there is shown at 106 the path of the cutting edge 107 of the tooth 51, which path has a radius greater than the path 108 of the heel 105 of the tooth, so that path 108 is spaced inwardly of path 106. In other words the path 106 is that of the cutting edge 107 of the tooth, said path 106 being coincidental with the bottom of a kerf or bore being cut and, since the radius of said path 106 and consequently the radius or bottom of said kerf or bore is greater than the path 108 of the heel 105 of the tooth, said heel is spaced from and clears the bottom of said kerf or bore. Thus it will be apparent that the tops of the cutting teeth or elements are so cut or sharpened at the sprocket end of the blade or bar that when said teeth are passing over the nose or nose wheel of the bar the heels 105 of said cutting teeth have sufficient clearance with respect to the bottom of the kerf or bore being cut as to provide maximum cutting effectiveness of said cutting teeth for boring operations.

Figure 6:
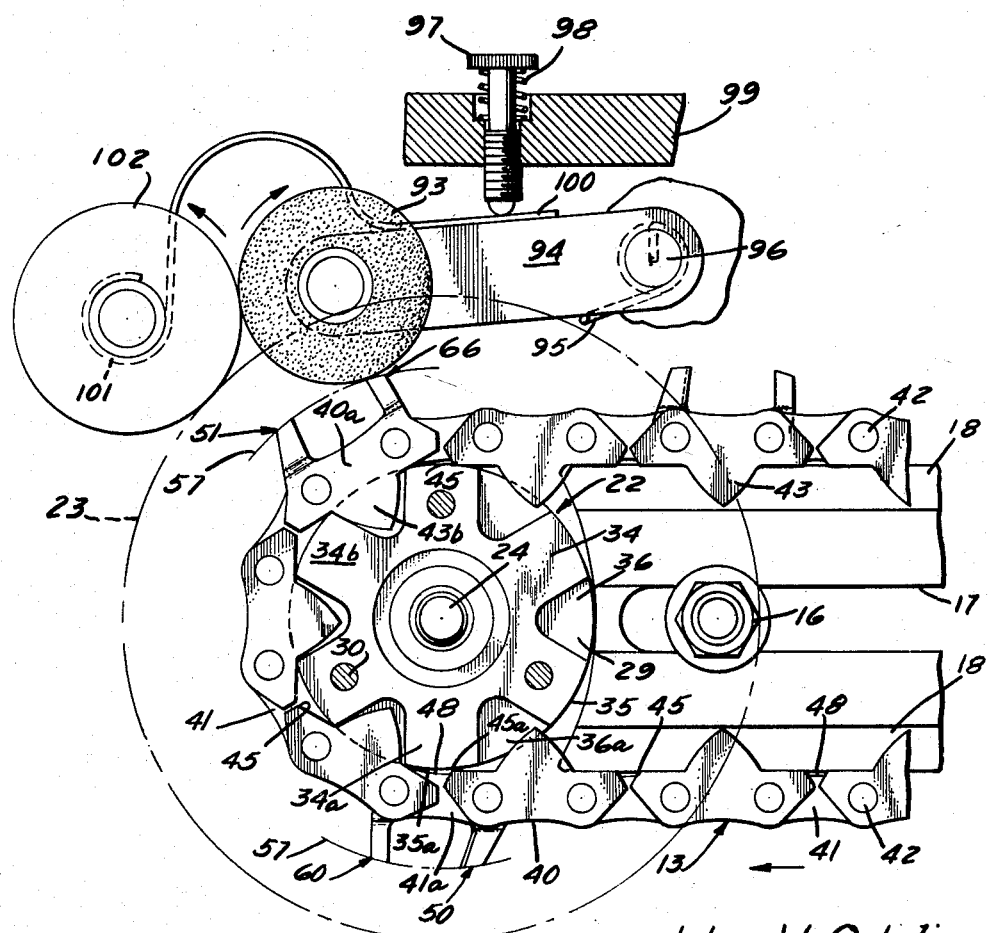
FIG. 6 is a fragmentary front elevational view taken as indicated along the line 6—6 of FIG. 5.

In FIGS. 5 and 6, another form of the invention is shown in which the sprocket assembly and the chain 13 are the same as that shown in FIG. 3, the cutting elements and their depth gauges as they pass over the driving mechanism, having their outer surfaces on equivalent arcs 57 whose centers are coincident with that of the drive shaft 24. In this embodiment, a grinding wheel 93 is supported on the chain saw engine at one end of a pivotable link 94 normally biased upwardly in its non-sharpening position by a spring 95 at its other end coiled on link pivot pin 96 which is supported on the engine frame. The link 94 is lowered against the force of spring 95 by a lead screw 97 extending through horizontal frame member 99 on the chain saw engine, and in an operable pressure relationship with the link. Screw 97 is held in a set position by spring 98.

Leaf spring 100 is secured to link 94 and extends upwardly thereupon into an inverted U-shape. On its lower external end 101 it supports a roller 102 which is biased by spring 100 to be in rotatable contact with the grinding wheel 93. Roller 102 may be of rubber or of any soft material which will serve to cause the grinding wheel to rotate when screw 97 lowers link 94 so that a point on the circumferential surface of the grinding wheel lies on the arc 57 at which time the roller 102 is in contact with the external surface of the clutch drum 23 by which it is rotated to in turn cause the grinding wheel to be rotated. Thus, as the chain depth gauges and cutting edges pass through the upper portion of their path on arc 57 around the driving sprocket assembly 22, they are ground and sharpened during normal cutting operation when the operator finds it is desirable to do so. When the sharpening is completed, the screw 97 is rotated to release the sharpening mechanism and the spring 95 will force it out of contact with the chain and clutch drum into its non-sharpening position.

As sharpening occurs during the use of a saw chain, the outer surfaces of the cutting elements and depth gauges will be ground away so that the length of the respective members will be shortened and the arcs 57 will likewise have their radii shortened. However, the grinding wheel 93 will continue to be movable into a corresponding sharpening position of contact with the arcs 57 of smaller radii.

It is clear that the sprocket and disc arrangements used in cooperation with the correspondingly arranged center and side links of the saw chain may be used in other forms without departing from the inventive principles disclosed herein and relating to the positioning of the chain on the sprocket assembly as it becomes engaged therewith to eliminate teetering and the accompanying wear on the abrasive parts. It also follows that the provision of a means to maintain the chain in a constant radial position on the sprocket assembly, as it is driven thereby, may be incorporated with other types of saw chain sharpening means without departing from the inventive principles disclosed herein relating to the oscillating hone and grinding wheel for sharpening the said chain cutting elements and depth gauges.

I claim:
1. In an engine driven chain saw having an endless saw chain driven by a driving sprocket, depth gauges and cutting elements extending outwardly from said saw chain, said depth gauges and said cutting elements having outer circumferential surfaces, each of the cutting elements and depth gauges on said chain being positioned and being of such length so that their respective cutting edges and outer circumferential surfaces travel through an arc around said sprocket, the center of said arc being coincident with the center of said sprocket; saw chain cutting element sharpening means on said chain saw adjacent the chain driving sprocket, said sharpening means comprising: a whetting member in a holder, said holder pivotally mounted on said chain saw so as to be movable to a position so that a point on the surface of said whetting member lies on said arc; means to pivot said holder to said position; spring means to bias said holder away from said position; and means to oscillate said holder and said whetting member transversely with respect to said pivot.

2. In an engine driven chain saw having an endless saw chain driven by a driving sprocket, cutting elements on said chain being positioned and being of such length so that their cutting edges and outer surfaces travel through an arc around said sprocket, the center of said arc being coincident with the center of said sprocket, saw chain cutter sharpening means on said chain saw adjacent the chain driving sprocket, said sharpening means comprising: a whetting member in a holder, said holder loosely pivotally mounted at one end thereof on said chain saw so as to be movable to a position so that a surface of said whetting member lies on said arc; a rotatable rod connected at one end to the other end of said holder, said rod being supported on said chain saw and being slidable to pivot said holder to said position, said rod being connected to said holder by a pin off center with respect to said rod so that when said rod is rotated said holder and said whetting member are oscillated transversely with respect to said pivot; screw means operable on the other end of said rod to slidably move said rod to pivot said holder; and spring means to bias said holder away from said position.

3. In an engine driven chain saw having an endless saw chain driven by a driving sprocket, depth gauges and cutting elements extending outwardly from said saw chain, said depth gauges and said cutting elements having outer circumferential surfaces, each of the cutting elements and depth gauges on said chain being positioned and being of such length so that their respective cutting edges and outer circumferential surfaces travel through an arc around said sprocket, the center of said arc being coincident with the center of said sprocket; saw chain cutting element sharpening means on said chain saw adjacent the chain driving sprocket, said sharpening means comprising:
(A) a whetting member in a holder pivotally mounted on said chain saw so as to be movable toward said driving sprocket to a position whereat a point on the surface of said whetting member lies on said arc;
(B) spring means to bias said holder away from said position;
(C) means to move said holder and said whetting member to said position;
(D) and means for pivotally oscillating laterally said holder when said whetting member is in said position.

4. In an engine driven chain saw:
(A) a saw chain bar with an arcuate nose at the free end;
(B) an endless saw chain operably mounted on the periphery of said bar and driven by a driving sprocket having a smaller radius than said nose;
(C) depth gauges and cutting elements extending outwardly on selected links of said saw chain, each of the cutting elements and depth gauges on said chain being positioned and being of such length that the respective cutting edges and outer surfaces thereof travel through an arc around said sprocket, the center of said arc being coincident with the center of said sprocket;
(D) and saw chain cutter element sharpening means operably mounted adjacent the chain driving sprocket and comprising
   (a) a whetting member pivotally mounted so as to be movable to a position so that a point on the surface of said whetting member lies on said arc,
   (b) means to pivot said whetting member to said position,
   (c) means for pivotally oscillating laterally said holder when said whetting member is in said position,
   (d) and means to hold said whetting member away from said position.

5. In a chain saw of the type having an endless saw chain mounted on a sprocket driven by an engine, means on said chain saw adjacent said engine to sharpen the cutters on the saw chain during the operation of said chain saw, said means to sharpen comprising:
(A) a whetting member mounted on said engine for predetermined movement into and out of sharpening contact relative to the cutting edges of said cutters;
(B) means on said chain saw to move said whetting member into sharpening contact with said cutting edges, said contact being made on a point of an arc through which each cutting edge passes as the cutters are carried on said sprocket;

(C) and means for pivotally oscillating said whetting element laterally with respect to said chain.

6. In a chain saw of the type having an endless saw chain mounted on a sprocket driven by an engine, means on said chain saw adjacent said engine to sharpen the cutters on the saw chain during the operation of said chain saw, said means to sharpen comprising:

(A) a whetting member mounted on said engine for predetermined movement into and out of sharpening contact relative to the cutting edges of said cutters;

(B) means on said chain saw to move said whetting member into sharpening contact with said cutting edges, said contact being made on a point of an arc through which each cutting edge passes as the cutters are carried on said sprocket;

(C) and means for arcuately moving said whetting element laterally with respect to said chain.

7. Means for sharpening the cutters on a saw chain, said chain being operably mounted on a driving sprocket and a saw chain bar, during the operation of said chain saw, said means comprising:

(A) a sharpening element; and (B) a mounting on a fixed support for said sharpening element including means operable for moving said element toward said sprocket and into sharpening contact with said cutters passing about said sprocket, and means operable for arcuately moving said sharpening element transversely relative to the plane of said bar.

8. In an engine driven chain saw:

(A) a saw chain bar with a convexly arcuate nose at the free end;

(B) an endless saw chain operably mounted on the periphery of said bar and driven by a driving sprocket having a smaller radius than said nose;

(C) depth gauges and cutting elements extending outwardly on selected links of said saw chain, each of the cutting elements and the depth gauges on said chain being positioned and being of such length that the respective cutting edges and outer surfaces thereof travel through an arc around said sprocket, the center of said arc being coincident with the center of said sprocket;

(D) and saw chain cutter element sharpening means operably mounted adjacent the chain driving sprocket and comprising (a) a non-rotatable whetting member on a holder, said holder being pivotally mounted so as to be movable to a position so that a point on the surface of said whetting member lies on said arc;

(b) means to pivot said holder to said position, (c) and means to hold said holder away from said position.

References Cited in the file of this patent

UNITED STATES PATENTS

| | | |
|---|---|---|
| 2,651,336 | Warren | Sept. 8, 1953 |
| 2,699,691 | Grupp | Jan. 18, 1955 |
| 2,729,987 | Bluemink | Jan. 10, 1956 |
| 2,821,097 | Carlton | Jan. 28, 1958 |
| 3,040,602 | Carlton | June 26, 1962 |

FOREIGN PATENTS

| | | |
|---|---|---|
| 581,061 | Germany | Dec. 4, 1930 |
| 811,667 | Germany | Aug. 23, 1951 |